United States Patent
Sengul et al.

(10) Patent No.: US 11,542,809 B2
(45) Date of Patent: Jan. 3, 2023

(54) POLISHED ROD LOAD CELL

(71) Applicant: Noven, Inc., Houston, TX (US)

(72) Inventors: Mahmut Sengul, Houston, TX (US); Mario Ruscev, Houston, TX (US)

(73) Assignee: NOVEN, INC., Houston, TX (US)

( * ) Notice: Subject to any disclaimer, the term of this patent is extended or adjusted under 35 U.S.C. 154(b) by 135 days.

(21) Appl. No.: 16/897,566

(22) Filed: Jun. 10, 2020

(65) Prior Publication Data

US 2020/0393309 A1  Dec. 17, 2020

Related U.S. Application Data

(60) Provisional application No. 62/859,912, filed on Jun. 11, 2019.

(51) Int. Cl.
*E21B 47/009* (2012.01)
*G01L 1/22* (2006.01)
*E21B 43/12* (2006.01)

(52) U.S. Cl.
CPC .............. *E21B 47/009* (2020.05); *G01L 1/22* (2013.01); *E21B 43/127* (2013.01)

(58) Field of Classification Search
CPC .............................. E21B 47/007; E21B 47/009
See application file for complete search history.

(56) References Cited

U.S. PATENT DOCUMENTS

| | | | | |
|---|---|---|---|---|
| 3,343,409 A | * | 9/1967 | Gibbs | E21B 47/008 73/152.61 |
| 3,965,736 A | * | 6/1976 | Welton | E21B 47/007 73/152.61 |
| 4,090,405 A | * | 5/1978 | McKee | G01L 5/0061 73/152.61 |
| 4,490,094 A | * | 12/1984 | Gibbs | E21B 47/009 417/42 |
| 4,509,901 A | * | 4/1985 | McTamaney | H03M 7/50 417/18 |
| 4,644,785 A | * | 2/1987 | Doyle | F04B 47/026 73/152.61 |
| 4,932,253 A | * | 6/1990 | McCoy | E21B 47/007 73/152.61 |
| 5,182,946 A | * | 2/1993 | Boughner | E21B 47/00 73/152.62 |
| 5,423,224 A | * | 6/1995 | Paine | G01B 7/16 73/765 |
| 5,464,058 A | * | 11/1995 | McCoy | F04B 47/02 166/250.01 |
| 9,080,438 B1 | * | 7/2015 | McCoy | E21B 47/009 |

(Continued)

*Primary Examiner* — Kristyn A Hall
*Assistant Examiner* — Nicholas D Wlodarski
(74) *Attorney, Agent, or Firm* — MH2 Technology Law Group LLP (57) ABSTRACT

An apparatus for measuring strain in a polished rod of a beam pump unit includes a body having an upper wide section, a lower wide section, and a narrow section having a reduced width in comparison to each of the upper and lower wide sections. A bore is formed in the narrow section. The apparatus also includes at least two connectors configured to connect the body to the rod. The bore is positioned between the two connectors in a direction that is parallel to an axis of the rod. The apparatus further includes a strain gauge positioned in the bore, so as to measure strain in the rod between the two points of connection.

25 Claims, 6 Drawing Sheets

(56) References Cited

U.S. PATENT DOCUMENTS

| | | | | |
|---|---|---|---|---|
| 9,983,076 B2* | 5/2018 | Zhao | ............ | F04B 17/006 |
| 2005/0089425 A1* | 4/2005 | Boone | ............ | F04B 47/028 |
| | | | | 417/448 |
| 2008/0240930 A1* | 10/2008 | Palka | ............ | F04B 47/022 |
| | | | | 417/42 |
| 2011/0185825 A1* | 8/2011 | Mackie | ............ | G01L 1/04 |
| | | | | 73/862.637 |
| 2011/0285527 A1* | 11/2011 | Arms | ............ | B64C 27/006 |
| | | | | 340/539.1 |
| 2012/0020808 A1* | 1/2012 | Lawson | ............ | F04B 51/00 |
| | | | | 417/18 |
| 2015/0176395 A1* | 6/2015 | McCoy | ............ | E21B 49/08 |
| | | | | 702/6 |
| 2015/0308257 A1* | 10/2015 | McCoy | ............ | E21B 47/009 |
| | | | | 340/853.2 |
| 2015/0323399 A1* | 11/2015 | Zhao | ............ | G01L 1/22 |
| | | | | 29/595 |
| 2015/0330200 A1* | 11/2015 | Richard | ............ | E21B 47/007 |
| | | | | 166/250.01 |
| 2015/0345280 A1* | 12/2015 | Krauss | ............ | G05B 15/02 |
| | | | | 700/282 |
| 2016/0138949 A1* | 5/2016 | Zhao | ............ | F04B 47/022 |
| | | | | 73/781 |
| 2017/0052078 A1* | 2/2017 | Zhao | ............ | F04B 49/065 |
| 2018/0217015 A1* | 8/2018 | Baker | ............ | F04B 49/065 |
| 2019/0218903 A1* | 7/2019 | Moreno | ............ | E21B 47/12 |
| 2020/0123892 A1* | 4/2020 | Picon | ............ | E21B 43/127 |
| 2020/0392822 A1* | 12/2020 | Sengul | ............ | F04B 47/028 |
| 2020/0392832 A1* | 12/2020 | Sengul | ............ | E21B 47/009 |
| 2020/0392833 A1* | 12/2020 | Sengul | ............ | E21B 47/009 |
| 2020/0392834 A1* | 12/2020 | Sengul | ............ | E21B 47/007 |
| 2020/0393309 A1* | 12/2020 | Sengul | ............ | G01L 5/0061 |
| 2021/0355810 A1* | 11/2021 | Vining | ............ | E21B 47/009 |
| 2021/0389197 A1* | 12/2021 | Sobin | ............ | G01L 5/04 |

* cited by examiner

POLISHED ROD LOAD CELL

CROSS-REFERENCE TO RELATED APPLICATIONS

This application claims priority to U.S. Provisional Patent Application having Ser. No. 62/859,912, which was filed on Jun. 11, 2019, and is incorporated hereby by reference in its entirety.

BACKGROUND

Beam pumping is the most widely used type of artificial lift method for oil and gas wells. A beam pump unit typically includes three segments: a surface unit, a rod string, and a subsurface pump.

Dynamometer surveys are performed to provide insight about volumetric efficiency, mechanical integrity, and operating efficiency of the beam pump unit. Dynamometer surveys are typically performed using either a transducer placed on the rod string, or a horseshoe load cell placed between the carrier bar and the polished rod clamp. However, installation of such transducers may be expensive and a labor-intensive process, and may involve shutting down the beam pump unit for hours or days. Therefore, it would be beneficial to have an improved system and method for capturing relative load measurements on a beam pump unit.

SUMMARY

An apparatus for measuring strain in a polished rod of a beam pump unit is disclosed. The apparatus includes a body having an upper wide section, a lower wide section, and a narrow section having a reduced width in comparison to each of the upper and lower wide sections. A bore is formed in the narrow section. The apparatus also includes at least two connectors configured to connect the body to the rod. The bore is positioned between the two connectors in a direction that is parallel to an axis of the rod. The apparatus further includes a strain gauge positioned in the bore, so as to measure strain in the rod between the two points of connection.

A method for measuring operation of a beam pump unit is also disclosed. The method includes attaching a measuring apparatus to a polished rod of the beam pump unit in at least two positions. The measuring apparatus comprises a body having an upper wide section connected to the polished rod, a lower wide section connected to the polished rod, a narrow section extending between the upper and lower wide sections, and a strain gauge. The method also includes operating the beam pump unit to provide artificial lift in a wellbore, measuring a strain in the polished rod between the at least two positions using the strain gauge while the beam pump is operating, and transmitting the measured strain to a computing device.

An apparatus for measuring strain in a polished rod of a beam pump unit is further disclosed. The apparatus includes a body defining a bore therein, the body including an upper wide section, a lower wide section, and a narrow section extending between the upper and lower wide sections, the narrow section having a reduced width in comparison to the upper and lower wide sections. The bore is formed in the narrow section. The apparatus also includes a first clamp coupled to the upper wide section and configured to be received around and secured to the polished rod, a second clamp coupled to the lower wide section and configured to be received around and secured to the polished rod, and a strain gauge positioned in the bore, so as to measure strain in the polished rod between locations where the first and second clamps are secured thereto.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
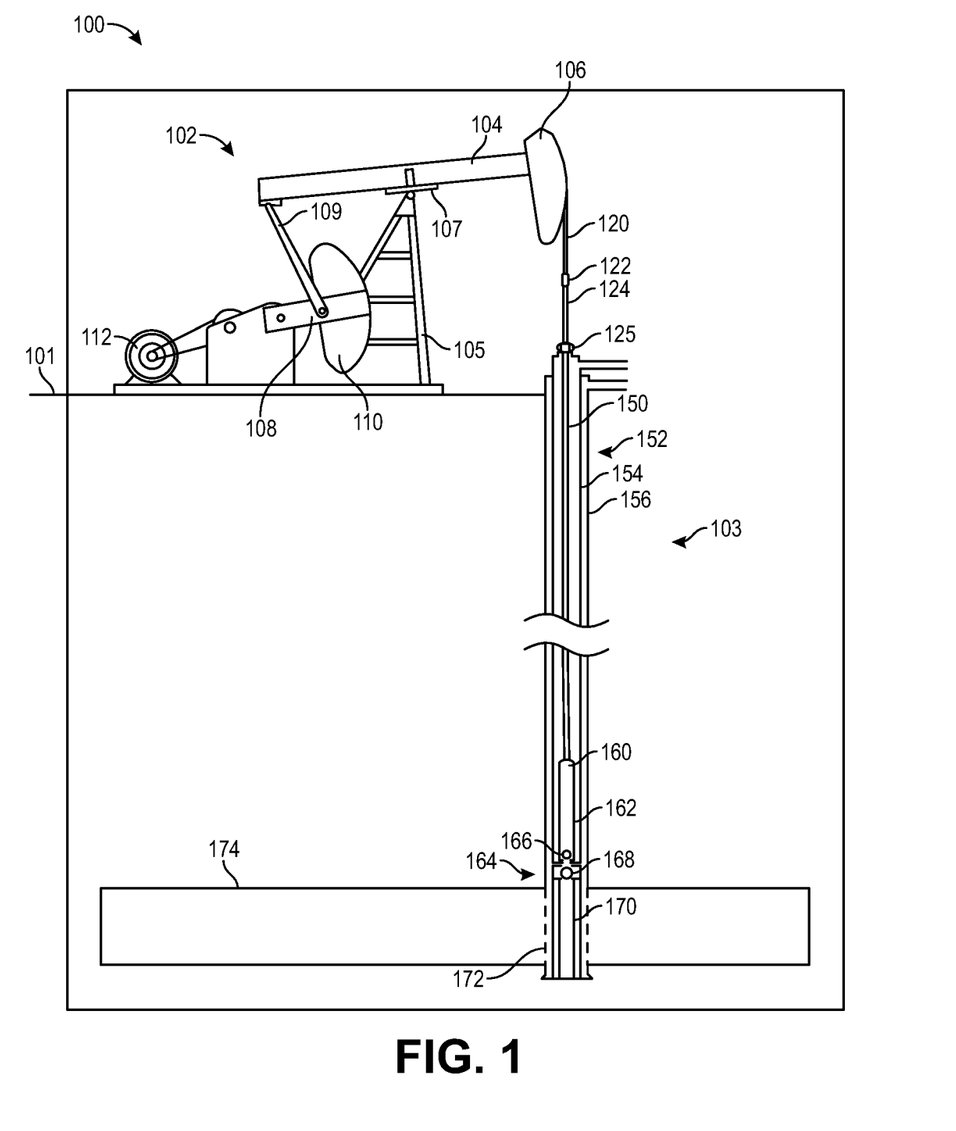
FIG. 1 illustrates a schematic view of a beam pump unit, according to an embodiment.

FIG. 1 illustrates a schematic view of a beam pump unit 100, according to an embodiment. The beam pump unit 100 may include a surface system 102 and a downhole system 103. The surface system 102 may include a walking beam 104 having a horsehead 106 connected at a distal end thereto. The walking beam 104 may be supported from the ground 101 by a samson post 105 connected to the walking beam 104 via a center bearing 107. At a proximal end of the walking beam 104, a pitman arm 109 may connect the walking beam 104 to a crank arm 108. The crank arm 108 may include a counterbalance weight 110, and may be driven by a prime mover 112, such as an internal-combustion engine. The prime mover 112 causes the crank arm 108 to move through an arc, generally up and down with respect to the ground 101. In turn, this drives the walking beam 104 to pivot about the center bearing 107, causing the horsehead 106 to move through an arc, generally up-and-down with respect to the ground 101.

A bridle 120 may be coupled to the horsehead 106 and may be connected via a carrier bar 122 to a polished rod 124. The polished rod 124 may connect the surface system 102 with the downhole system 103. A stuffing box 125 (and/or other components of a wellhead) may prevent egress of fluids, gasses, etc. from the downhole system 103 along the polished rod 124. The downhole system 103 may include sucker rods 150 that extend down through a wellbore 152, e.g., through production tubing 154 and a casing 156 disposed in the wellbore 152. A plunger 160 may be connected to a lower end of the sucker rods 150. The plunger 160 may fit into a pump barrel 162, and a valve system 164 (e.g., a travelling valve 166 and a standing valve 168) may be positioned at or near to the lower end of the sucker rods 150. A gas anchor 170 may be positioned at the bottom of the wellbore 152, e.g., near perforations 172 formed therein, which may provide a communication path for fluids, e.g., hydrocarbons, in a subterranean reservoir 174. Accordingly, as the surface system 102 operates to move the horsehead 106 up and down, this movement is transmitted via the bridle 120, carrier bar 122, and polished rod 124 to the sucker rods 150. In turn, the sucker rods 150 apply pressure into the wellbore 152, which tends to draw fluid upward in the production tubing 154, enabling production of fluid, e.g., hydrocarbons, from the perforations 172 to the surface.

Figure 2:
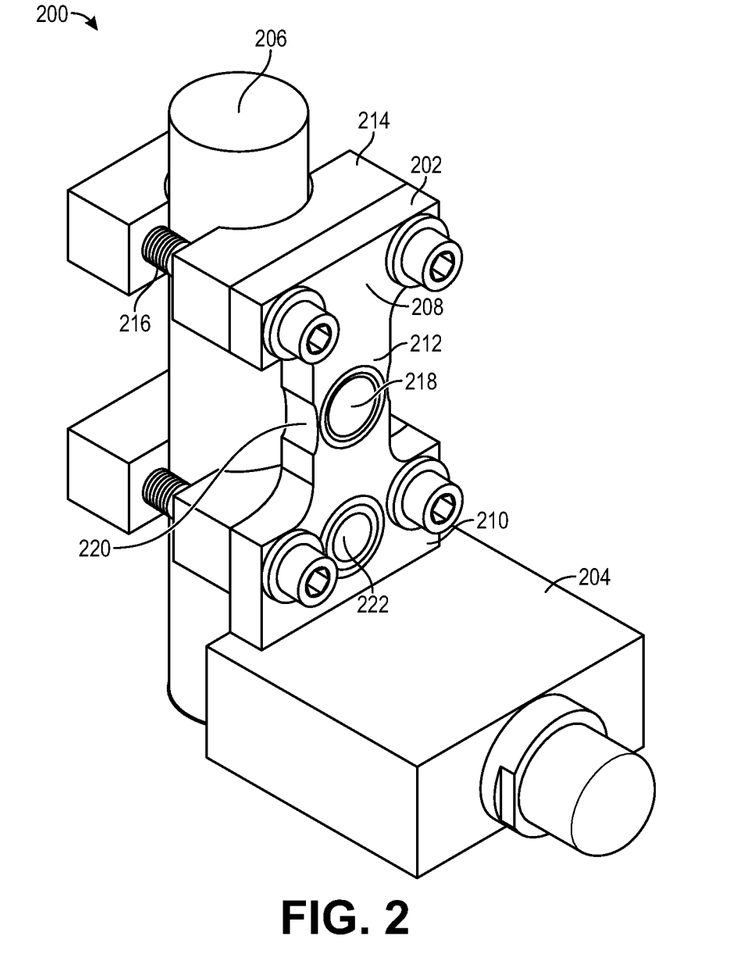
FIG. 2 illustrates a perspective view of an apparatus for measuring load in a polished rod of the beam pump unit, according to an embodiment.

FIG. 2 illustrates a perspective view of an apparatus 200 for measuring a load on a polished rod of the beam pump unit 100, according to an embodiment. In general, the apparatus 200 may be configured to be coupled to the polished rod (e.g., the polished rod 124 of FIG. 1, above the stuffing box 125) and to provide measurements for generating a surface dynamometer card. The apparatus 200 may be or include a strain gauge, a matching electronic circuit, and a (e.g., BLUETOOTH®) transceiver. The strain gauge measures the change in length of at least a portion of the polished rod 124 caused by load variation during the upstroke and downstroke of the polished rod 124. The sensed load may be represented as an analog voltage value (e.g., in millivolts), which may be converted to a digital value by an analog-to-digital converter (ADC). The digital value may be transmitted to a computing system (e.g., a wellsite gateway) using, for example, BLUETOOTH® very-low-energy (BLE) communication. The data may be time-stamped. The measured changes in length may be converted to load values using a calibration chart/table that is specific to the strain gauge.

In the specific, illustrated embodiment, the apparatus 200 includes an I-beam measurement body 202 and an enclosure (or "housing") 204. The I-beam measurement body 202 is configured to be secured to a polished rod 206. For example, the measurement body 202 may have upper and lower wide sections 208, 210, with a narrow section 212 extending therebetween. Clamps 214 may be connected to the two wide sections 208, 210, which may be configured to secure the measurement body 202 to the rod 206 at two, axially-offset points. Although clamps 214 are shown, other devices may be used to secure the measurement body 202 to the polished rod 206. In this embodiment, bolts 216 may extend through the clamps 214 and draw the jaws thereof together, such that the clamp 214 is tightly secured to the polished rod 206.

The measurement body 202 may also include a bore 218 in the narrow section 212, which extends normal to the measurement body 202 and therethrough. The bore 218 may be circular as shown, or any other suitable shape. A strain gauge (not visible) may be secured to the wall of the bore 218. The strain gauge may measure the relative displacement of the upper and lower wide sections 208, 210 from one another, which may be proportional to the load applied to the rod 206. Further, the measurement body 202 may include cutouts 220, e.g., on either lateral side of the bore 218, which may serve to reduce a will thickness between the edges of the narrow section 212 and the bore 218, thereby decreasing the rigidity of the measurement body 202. As a result, the sensitivity of the strain gauge increases.

Referring to the strain gauge in greater detail, the strain gauge may be or include a sensor, the resistance of which varies with the applied force/load. The strain gauge thus converts force, pressure, tension, weight, etc., into a change in electrical resistance that can then be measured and converted into strain. When external forces are applied to a stationary object (e.g., the polished rod), stress and strain are the result. Stress is defined as the object's internal resisting forces, and strain is defined as the displacement and deformation that occur. The strain may be or include tensile strain and/or compressive strain, distinguished by a positive or negative sign. Thus, the strain gauge may be configured to measure expansion and contraction of the polished rod under static or dynamic conditions.

The (e.g., absolute) change of length $\Delta l$ of the polished rod 124 is the difference between a length l of a section of the polished rod 124 at the time of the measurement and an original length thereof (i.e., the reference length $l_0$). Thus, $\Delta l = l - l_0$. Strain=$\Delta l/l$=% elongation. The strain is caused by an external influence or an internal effect. The strain may be caused by a force, a pressure, a moment, a temperature change, a structural change of the material, or the like. If certain conditions are fulfilled, the amount or value of the influencing quantity can be derived from the measured strain value. Using the apparatus 200 described herein, the strain may be determined without using Poisson's ratio.

The strain gauge may be or include a metallic foil-type strain gauge that includes a grid of wire filament (e.g., a resistor) having a thickness less than or equal to about 0.05 mm, about 0.025 mm, or about 0.01 mm. The wire filament may be coupled (e.g., bonded) directly to the strained surface of the polished rod by a thin layer of epoxy resin. When the load is applied to the polished rod, the resulting change in surface length is communicated to the resistor, and the corresponding strain is measured in terms of electrical resistance of the wire filament. The resistance may vary linearly with the strain. The wire filament and the adhesive bonding agent work together to transmit the strain. The adhesive bonding agent may also serve as an electrical insulator between the polished rod and the wire filament.

The measurement body may include a second bore 222, in some embodiments, which may be positioned in the lower wide section 210. Electrical components of the apparatus may be positioned within the second bore 222, as will be described in greater detail below.

The enclosure 204 may house various other electrical components. In an embodiment, the enclosure 204 may contain a printed circuit board including a microprocessor thereon, and an antenna. The antenna may communicate wirelessly with nearby computing devices, e.g., via a (e.g., clear, polymeric) antenna housing 224 that is attached to the enclosure 204. The enclosure 204 may be made from metal, such as stainless steel, or may be made from a polymer or composite material.

The apparatus 200 may be configured to capture load data that may be used as part of a dynamometer survey. The dynamometer survey may be used to analyze volumetric efficiency of the subsurface pump and/or the well, as well as the mechanical integrity and operating efficiency of the subsurface pump.

Figure 3:
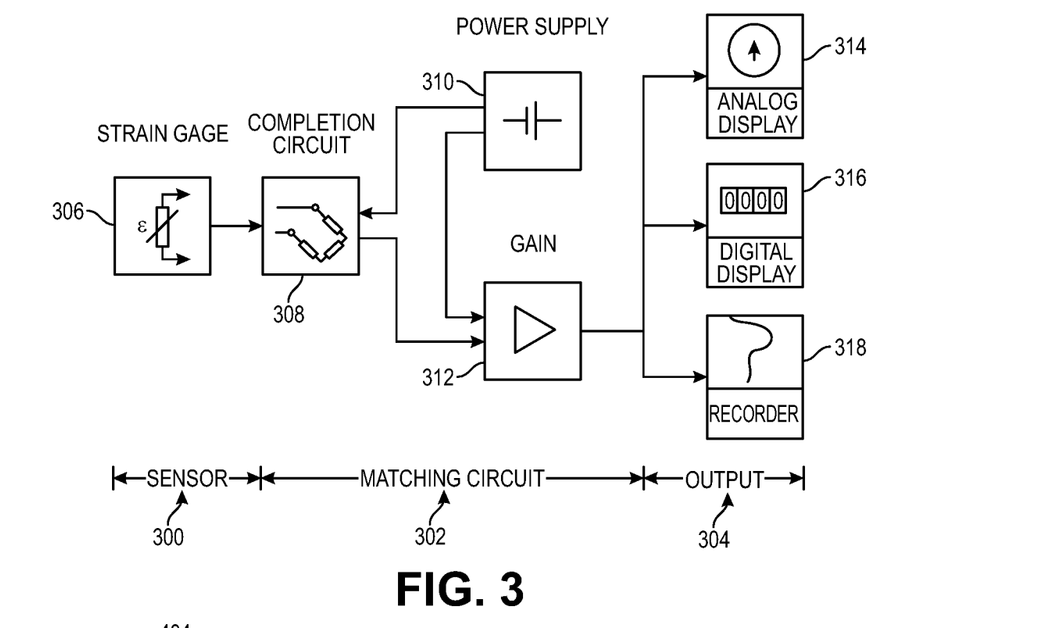
FIG. 3 illustrates a schematic view of electrical components for the apparatus, according to an embodiment.

FIG. 3 illustrates a schematic view of the electrical components of the apparatus 200, according to an embodiment. As shown, the electrical components include a sensor 300, a matching circuit 302, and an output section 304. The sensor 300 may be or include the aforementioned strain gauge, now labeled 306, which may be positioned in the bore 218 (FIG. 2) as discussed above. The matching circuit 302 may be at least partially positioned in the second bore 222. For example, the matching circuit 302 may include a completion circuit 308, which may be positioned in the second bore 222. The completion circuit 308 may be electrically coupled to the strain gauge 306. The matching circuit 302 may further include a power supply 310 and an amplifier 312.

The power supply 310 may feed a power signal to the completion circuit 308 and the strain gauge 306, and separately to the amplifier 312. The strain gauge 306 may, as a result of the power fed thereto, provide a signal through the completion circuit 308 to the amplifier 312, which is proportional to the load on the polished rod 206. Once amplified 312, the signal is fed to the output section 304. The output section 304 may include any one or more of an analog display 314, a digital display 316, and/or a recorder 318. The output section 304 may be integrated into the apparatus 200 or may be part of a separate computing system that is in communication with the apparatus 200, e.g., via the antenna.

Figure 4:
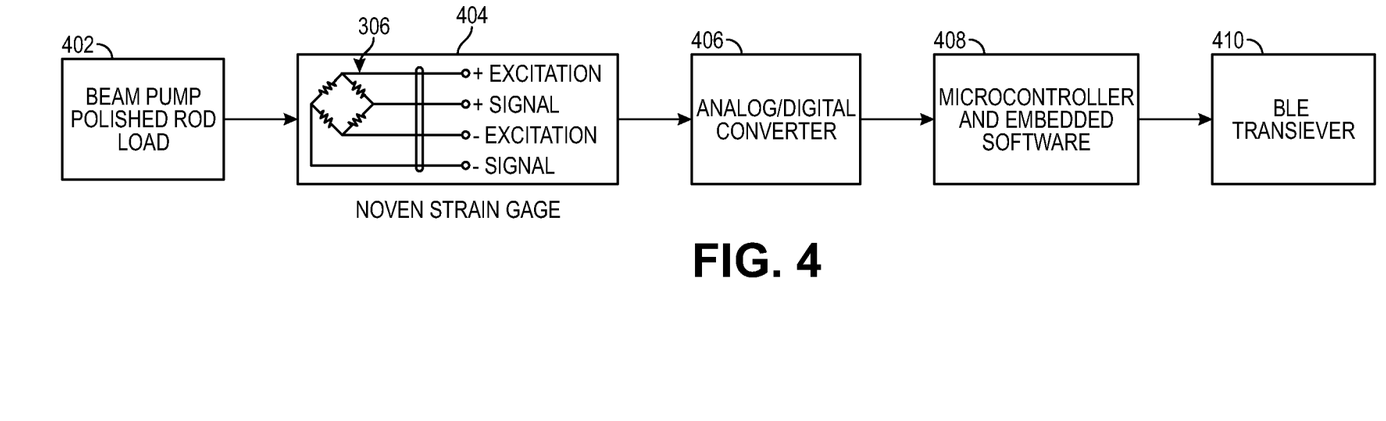
FIG. 4 illustrates block diagram of a system for measuring load in the polished rod of a rod pumping assembly, according to an embodiment.

FIG. 4 illustrates a block diagram of a system for recording load on a polished rod using the apparatus 200 discussed above, according to an embodiment. As shown, the beam pump polished rod load 402 is measured by the strain gauge 306, which is provided with power (excitation) and returns a signal. An analog-to-digital converter 406 receives the signal and produces a digital signal therefrom. A microcontroller and embedded software 408 (e.g., in the enclosure 204) receives and processes the signal and provides the signal to a BLE transceiver 410 (an example of the antenna of the apparatus 200) for transmission to external computing devices.

Figure 5:
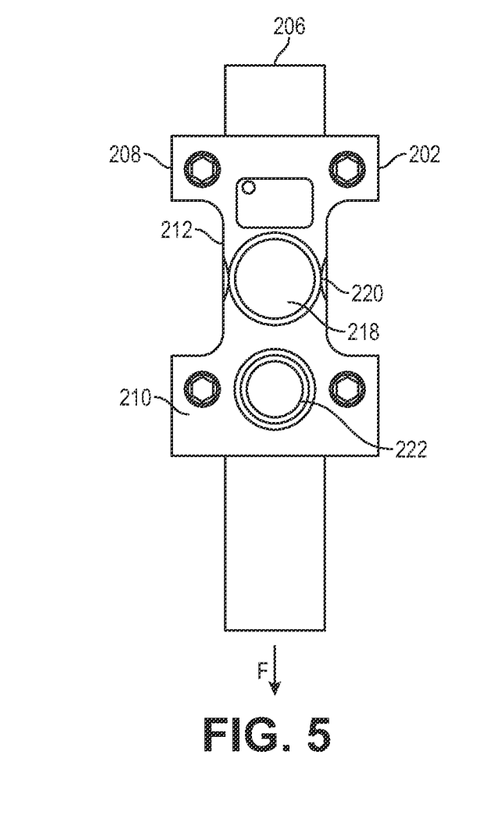
FIG. 5 illustrates a plan view of a measurement body of the apparatus, according to an embodiment.

FIG. 5 illustrates a plan view of the I-beam measurement body 202 of the apparatus 200 attached to the polished rod 206, according to an embodiment. As shown, the upper and lower wide sections 208, 210 are connected together by the narrow section 212 that extends parallel to the polished rod 206. The bores 218, 222 extend through the measurement body 202, e.g., the bore 218 extends through the narrow section 212 and the bore 222 extends through the lower wide section 210. As can also be seen, the wall of the narrow section 212 at the bore 218 is thinned by the cutouts 220, thereby enhancing the sensitivity of the apparatus 200.

Figure 6:
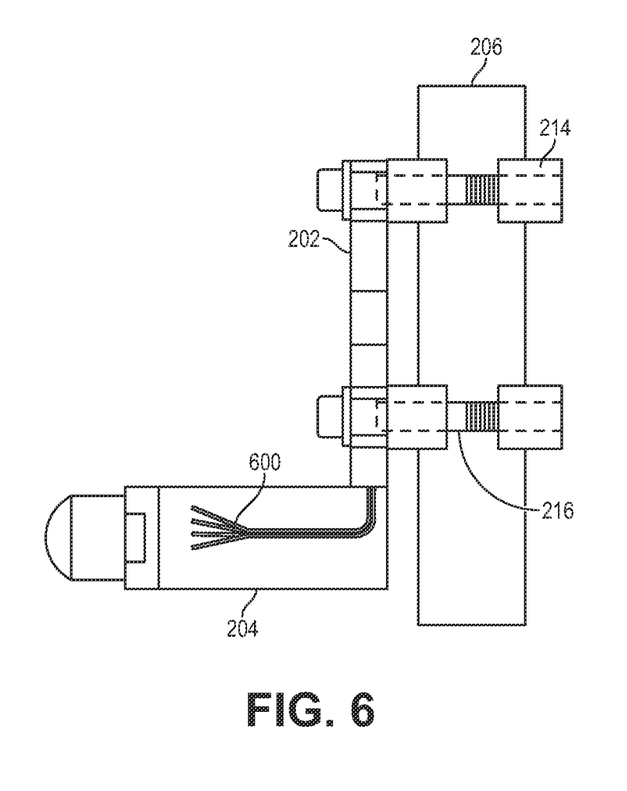
FIG. 6 illustrates a side view of the apparatus, according to an embodiment.

FIG. 6 illustrates a side, cross-sectional view of the apparatus 200, according to an embodiment. As shown, electrical leads (wires) 600 extend through and out of the measurement body 202, and into the enclosure 204, where they may connect to a printed circuit board positioned within the enclosure.

Figure 7:
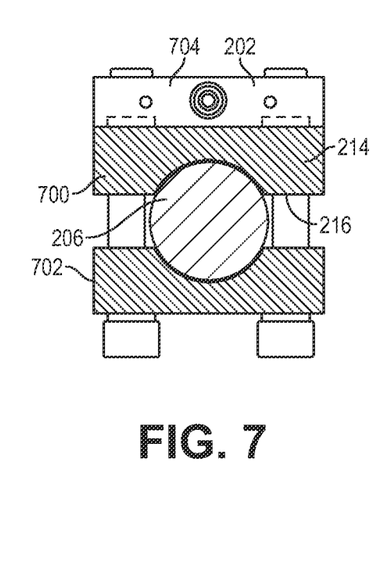
FIG. 7 illustrates a top, cross-sectional view of the apparatus, according to an embodiment.

FIG. 7 illustrates a top, cross-sectional view of the apparatus 200, showing one of the clamps 214, according to an embodiment. The clamp 214 may include jaws 700, 702, which may be sized to fit securely around the polished rod 206, and thereby provide two fixed points of contact with the polished rod 206. Additionally, FIG. 7 shows a conduit 704 formed through the measurement body 202. The wires 600 may run through the conduit 704 to connect the various electrical components together between the enclosure 204 and the bores 218, 222.

Figure 8:
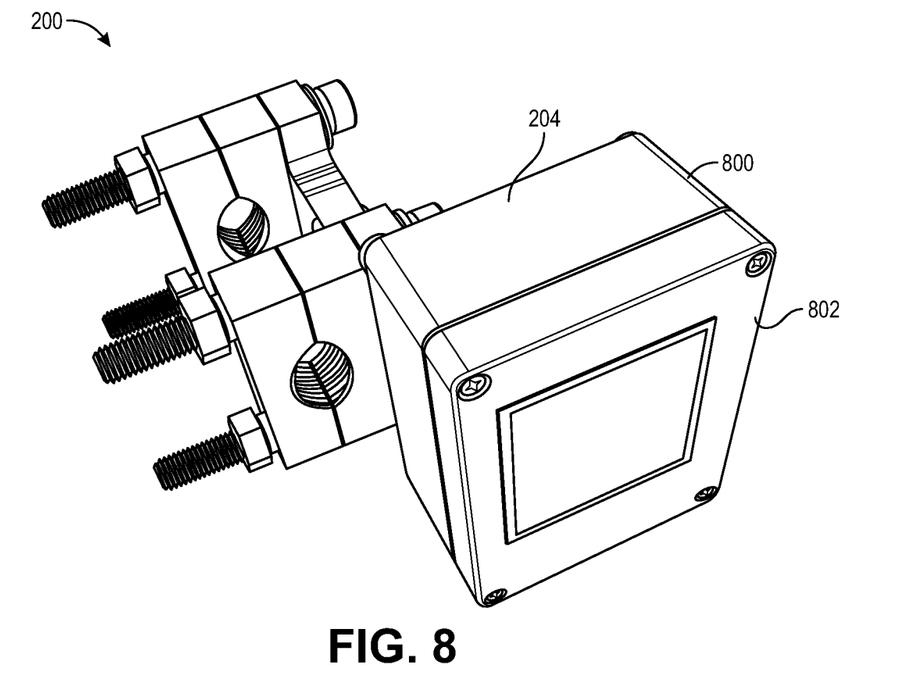
FIG. 8 illustrates a perspective view of another embodiment of the apparatus.

FIG. 8 illustrates a perspective view of the apparatus 200, according to an embodiment. The view of FIG. 8 is similar to FIG. 2, except, in this embodiment, the antenna is integrated within the enclosure 204. Further, the enclosure 204 includes a base 800 and a removable faceplate 802, which facilitates access to the electrical components therein.

Figure 9:
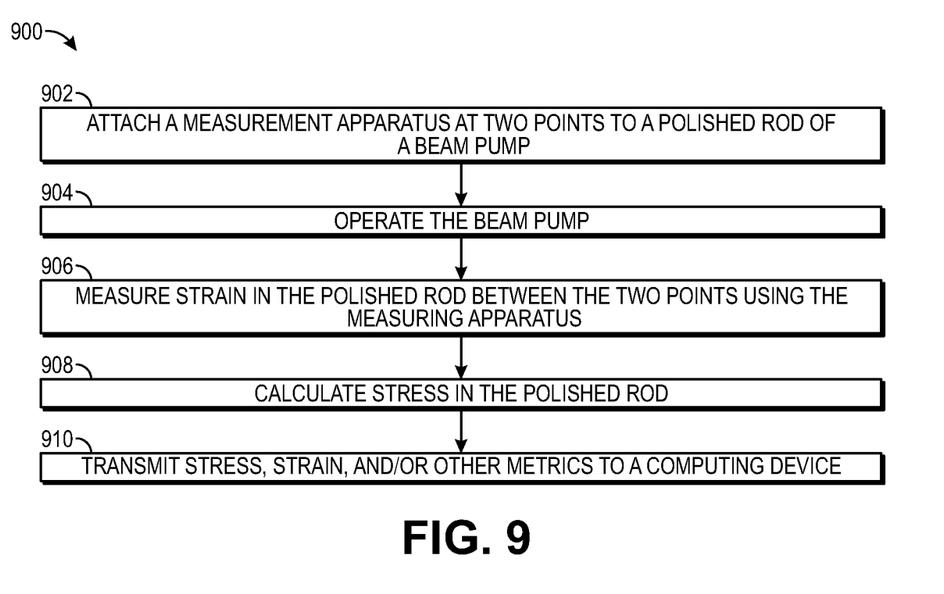
FIG. 9 illustrates a flowchart of a method for measuring strain (and/or other metrics) in a polished rod of a beam pump unit, according to an embodiment.

FIG. 9 illustrates a flowchart of a method 900 for measuring strain in a beam pump unit, e.g., the unit 100 discussed above with reference to FIG. 1, according to an embodiment. The method 900 may be executed using an embodiment of the apparatus 200, as discussed above, but other embodiments may use other apparatuses, and thus the method 900 should not be considered limited to any particular structure unless otherwise specified herein.

The method 900 may include attaching a measuring apparatus 200 to a polished rod 124 of a beam pumping system 100, as at 902. Such attaching may be accomplished without disassembling the polished rod 124 from the carrier bar 122 or the sucker rod 150. Rather, the polished rod 124 may remain coupled to any other components during the attaching step at 902.

In some embodiments, attaching at 902 may include attaching at two, axially-offset points. For example, in FIG. 2, two different clamps 214 are provided, which are axially-offset from one another, with one being coupled to the section 210 and the other being attached to the section 208. The attachment at 902 may thus result in two connections to the polished rod 124 that are not movable (until disconnected) relative to the polished rod 124.

The method 900 may then include performing artificial lift operations in a wellbore using the beam pumping system 100, with the measuring apparatus 200 attached thereto, as at 904. While performing the artificial lift operations at 904, the method 900 may include measuring a strain in the polished rod 124 using the measuring apparatus 200, as at 906. For example, the strain may be measured continuously, at a sampling frequency, etc., during operation of the beam pump unit 100. The strain may be measured using a strain gauge 306 that is positioned between the two axially-offset points at which the apparatus 200 is attached to the polished rod 124.

From the strain, a calculation of the stress in the polished rod 124 may be calculated, as at 908. Further, the stress, strain, or other metrics may be transmitted, e.g., in real-time, or stored and later transmitted batch-wise, to a computing device, as at 910. The computing device may be positioned near to the apparatus 200, such that short-range communications are sufficient to transmit the data from the apparatus 200 to the computing device; however, in other embodiments, long-range data transmission (e.g., via cellular or satellite communications) could be employed additionally or instead of such short-range communication links.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. An apparatus for measuring strain in a polished rod of a beam pump unit, the apparatus comprising:
    a body comprising:
       an upper wide section;
       a lower wide section, wherein a first bore is formed in the upper wide section or the lower wide section in a direction that is substantially perpendicular to the polished rod; and
       a narrow section having a reduced width in comparison to each of the upper and lower wide sections, wherein a second bore is formed in the narrow section in a direction that is substantially perpendicular to the narrow section and the polished rod;
    at least two connectors configured to connect the body to the polished rod, wherein the second bore is positioned between the two connectors;
    a first electrical component positioned in the first bore; and
    a strain gauge positioned in the second bore, so as to measure strain in the polished rod between the two points of connection.

2. The apparatus of claim 1, wherein the at least two connectors comprise clamps that are positionable around the polished rod without disconnecting the polished rod to one or more other components attached to ends of the polished rod.

3. The apparatus of claim 1, wherein:
    the upper wide section is connected to a first connector of the at least two connectors; and
    the lower wide section connected to a second connector of the at least two connectors.

4. The apparatus of claim 3, wherein the body defines a cutout in the narrow section, proximal to the second bore, such that a wall thickness between the second bore and an edge of the narrow section is reduced by the cutout.

5. The apparatus of claim 3, wherein the first electrical component is in electrical communication with the strain gauge in the second bore.

6. The apparatus of claim 1, further comprising:
    an enclosure coupled to the body; and
    a circuit board electrically connected to the strain gauge and positioned in the enclosure.

7. The apparatus of claim 6, wherein the enclosure is coupled to the lower wide section.

8. The apparatus of claim 6, wherein the strain gauge is coupled to the circuit board via one or more electrical lines that extend within the body.

9. The apparatus of claim 6, wherein the circuit board comprises an antenna and is in communication with an external computing device via the antenna.

10. The apparatus of claim 1, wherein the strain gauge is configured to measure the strain on the polished rod between where the first and second connectors are connected thereto.

11. The apparatus of claim 1, wherein the body defines first and second cutouts in the narrow section, wherein the bore is positioned between the first and second cutouts, and wherein the first and second cutouts serve to reduce a thickness between opposing edges of the narrow section and the bore, which decreases a rigidity of the narrow section, and thereby increases a sensitivity of the strain gauge in the bore.

12. The apparatus of claim 1, wherein the first electrical component comprises a circuit.

13. The apparatus of claim 12, wherein the circuit comprises a matching circuit that is in wired communication with the strain gauge.

14. The apparatus of claim 12, further comprising:
    an enclosure coupled to the body; and
    a second electrical component positioned in the enclosure.

15. The apparatus of claim 14, wherein the second electrical component comprises:
    a printed circuit board configured to receive and process the measured strain; and
    an antenna configured to wirelessly transmit the processed measured strain.

16. The apparatus of claim 1, wherein the body comprises an I-beam shape, wherein the apparatus further comprises an enclosure that is coupled to and extends laterally away from the upper wide section or the lower wide section of the body, wherein a printed circuit board is positioned within the enclosure, and wherein the printed circuit board is in wired communication with the first electrical component in the first bore and the strain gauge in the second bore.

17. A method for measuring operation of a beam pump unit, comprising:
    attaching a measuring apparatus to a polished rod of the beam pump unit using a first clamp and a second clamp, wherein the measuring apparatus comprises:
       a body having an upper wide section connected to the polished rod;
       a lower wide section connected to the polished rod, wherein a first bore is formed in the upper wide section or the lower wide section in a direction that is substantially perpendicular to the polished rod;
       a narrow section extending between the upper and lower wide sections;
       a first electrical component positioned in the first bore; and
       a strain gauge positioned in a second bore that extends through the narrow section in a direction that is substantially perpendicular to the narrow section and the polished rod;

operating the beam pump unit to provide artificial lift in a wellbore;

measuring a strain in the polished rod between the at least two positions using the strain gauge while the beam pump is operating; and transmitting the measured strain to a computing device.

18. The method of claim 17, wherein attaching the measuring apparatus does not require disconnecting the polished rod from a carrier bar or a sucker rod of the beam pump unit.

19. The method of claim 17, wherein attaching comprises fixing the first clamp to the upper wide section and around the polished rod, and fixing the second clamp to the lower wide section and around the polished rod.

20. The method of claim 17, further comprising calculating stress in the polished rod based in part on the strain.

21. An apparatus for measuring strain in a polished rod of a beam pump unit, the apparatus comprising:
   a body comprising:
      an upper wide section;
      a lower wide section, wherein a first bore is formed in the upper wide section or the lower wide section in a direction that is substantially perpendicular to the polished rod; and
      a narrow section extending between the upper and lower wide sections, the narrow section having a reduced width in comparison to the upper and lower wide sections, wherein a second bore is formed in the narrow section in a direction that is substantially perpendicular to the narrow section and the polished rod;
   a first clamp coupled to the upper wide section and configured to be received around and secured to the polished rod;
   a second clamp coupled to the lower wide section and configured to be received around and secured to the polished rod;
   a first electrical component positioned in the first bore; and
   a strain gauge positioned in the second bore, so as to measure strain in the polished rod between locations where the first and second clamps are secured thereto.

22. The apparatus of claim 21, further comprising:
   an enclosure coupled to the lower wide section of the body; and
   a circuit board electrically connected to the strain gauge and positioned in the enclosure, wherein the strain gauge is electrically coupled to the circuit board via one or more electrical lines that extend within the body.

23. The apparatus of claim 22, wherein the circuit board comprises an antenna and is in communication with an external computing device via the antenna.

24. The apparatus of claim 21, wherein the body defines a cutout in the narrow section, proximal to the second bore, such that a wall thickness between the second bore and an edge of the narrow section is reduced by the cutout.

25. The apparatus of claim 1, wherein the body defines first and second cutouts in the narrow section, wherein the second bore is positioned between the first and second cutouts, and wherein the first and second cutouts serve to reduce a thickness between opposing edges of the narrow section and the second bore, which decreases a rigidity of the narrow section, and thereby increases a sensitivity of the strain gauge in the second bore.

* * * * *